Figure 1:
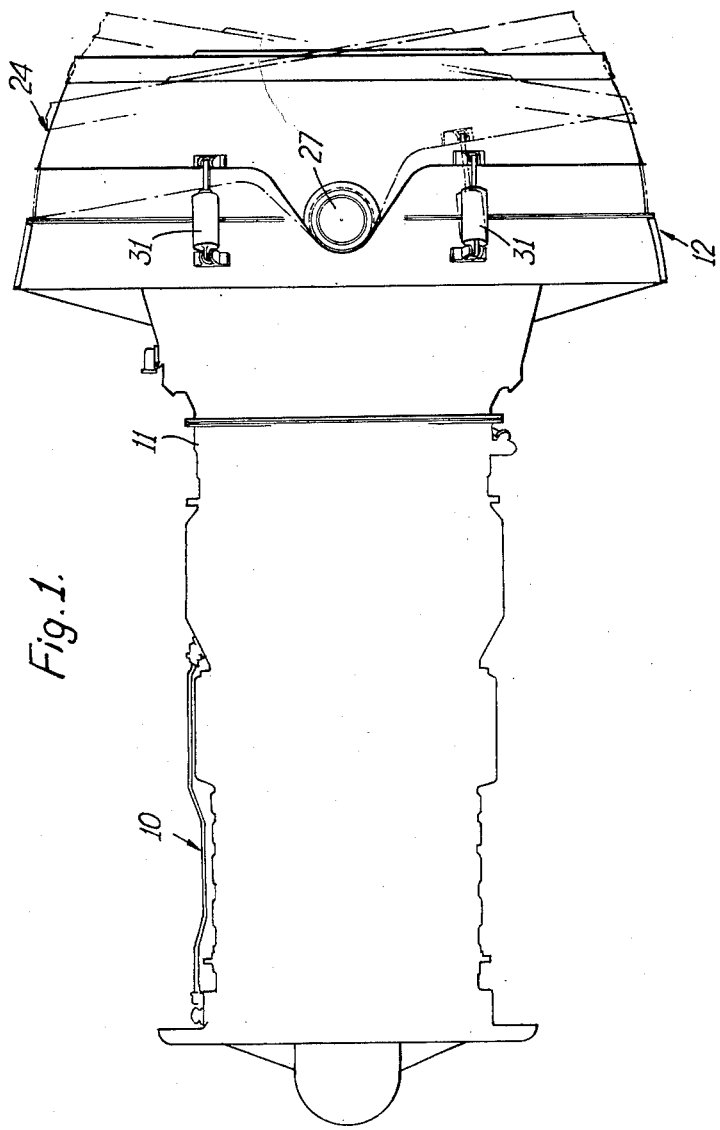

July 3, 1962 S. D. THOMAS ET AL 3,041,830
STEERING DEFLECTOR FOR A TURBO-FAN ENGINE
Filed Aug. 8, 1960 3 Sheets-Sheet 3

3,041,830
STEERING DEFLECTOR FOR A TURBO-FAN ENGINE
Samuel David Thomas and Maurice Ian Taylor, Allestree, England, assignors to Rolls-Royce Limited, Derby, England, a British company
Filed Aug. 8, 1960, Ser. No. 47,969
Claims priority, application Great Britain Aug. 17, 1959
2 Claims. (Cl. 60—35.55)

This invention concerns fan units and, although the invention is not so restricted, it will be described hereinafter with particular reference to a fan unit employed on an aircraft adapted for vertical take-off and landing.

Such aircraft, in addition to one or more forward propulsion engines which are used during forward flight of the aircraft, may be provided with vertical lift engines which are used to effect take-off and landing of the aircraft. The term "vertical lift engines," as used in this specification, is to be understood to mean engines arranged to produce lift forces on the aircraft independently of lift forces generated aerodynamically by forward flight.

The vertical lift engines of the said aircraft may consist exclusively of or may comprise fan units. Thus the vertical lift engines may consist of gas turbine engines provided with rear mounted fans driven by freely rotatable turbines in the engines, the fan outputs being disposed annularly about the engine jet gases. This has the effect of augmenting the thrust of the gas turbine engines.

It is desirable to be able to alter the direction of the thrust developed by the vertical lift engines so as to assist the transition between vertical and horizontal flight and vice versa. It is therefore an object of the present invention to provide a fan unit the direction of whose thrust may be varied.

According to the present invention there is provided a fan unit comprising a casing through which flows the fan output, the downstream portion of the casing being substantially sealed to but movable with respect to the remainder of the casing so that the fan output may be directed at an angle to the longitudinal axis of the fan unit.

Preferably the said remainder of the casing is pivotally mounted in fixed structure about an axis at right angles to the longitudinal axis of the fan unit.

The downstream portion of the casing is preferably constituted by a casing member which is pivotally mounted on the casing proper so that the casing member may be pivoted about an axis at right angles to the longitudinal axis of the fan unit, the casing member and casing proper having co-operating part-spherical portions which are mounted closely adjacent to each other.

In its preferred form, the invention comprises a gas turbine engine comprising a fan unit driven by the turbine of the engine, a fan casing through which flows the fan output, a casing member which extends downstream of the fan casing and which is pivotally mounted on the fan casing about an axis at right angles to the longitudinal axis of the fan casing, the fan casing and casing member having co-operating part-spherical portions mounted closely adjacent to each other, and means for effecting relative pivotal movement between the fan casing and casing member whereby to direct the fan output at an angle to said longitudinal axis.

Preferably the fan casing is mounted about an exhaust pipe of the gas turbine engine, the said casing member having a part-spherical portion internally thereof which co-operates with a corresponding part-spherical portion of the exhaust pipe, whereby the said relative pivotal movement directs both the fan output and the turbine exhaust gases at an angle to the longitudinal axis of the engine.

Mounting means are preferably provided to permit pivotal movement of the engine about an axis at right angles to its longitudinal axis.

The invention also comprises an aircraft provided with a gas turbine engine as set forth above, the engine being mounted for pivotal movement about an horizontal axis, whereby the engine may be disposed with its longitudinal axis at an angle to the vertical and the casing member may be disposed with its longitudinal axis at a larger angle to the vertical.

Figure 2:
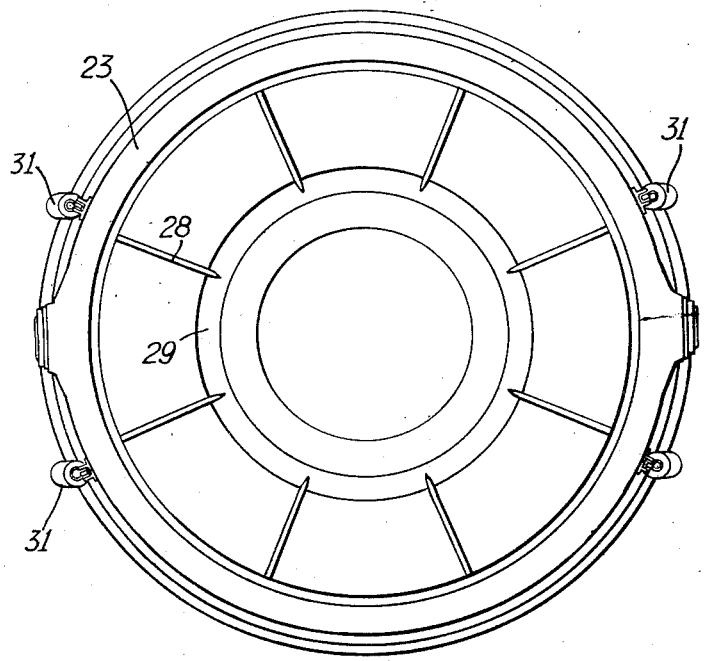
Figure 4:
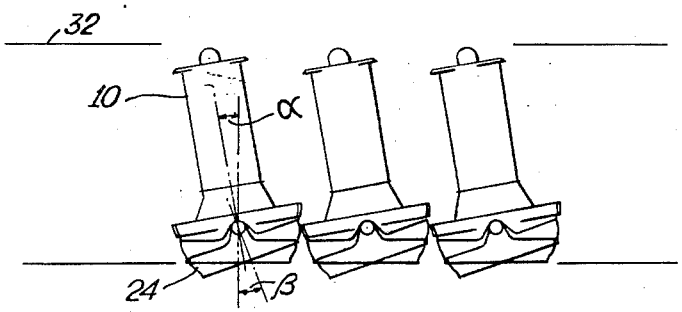
Figure 3:
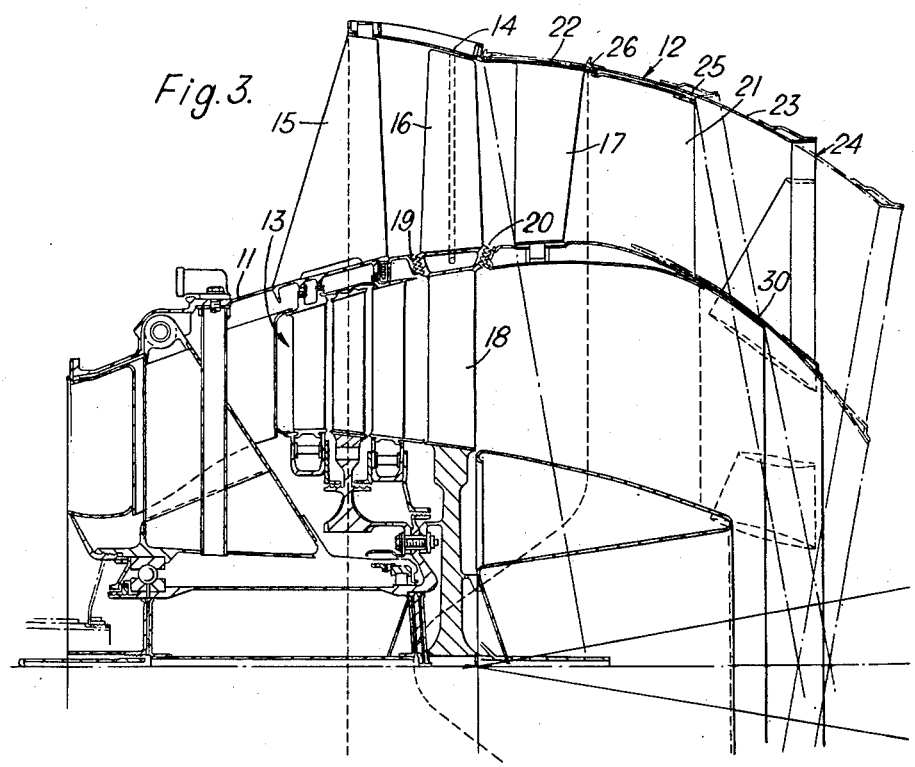

The invention is illustrated, merely by way of example, in the accompanying drawings, in which:

FIGURES 1 and 2 are respectively a side elevation and an end view of a gas turbine engine provided with a rear-mounted fan unit in accordance with the invention, FIGURE 3 is a longitudinal section through a part of the engine shown in FIGURES 1 and 2, and FIGURE 4 illustrates diagrammatically a plurality of the engines of FIGURES 1 and 2 mounted in an aircraft wing.

Referring to the drawings, a gas turbine engine 10, adapted for us as a vertical lift engine, has an engine casing 11 which is provided with a rear mounted fan unit 12 being mounted about the turbine 13 of the engine.

The fan unit 12, which is provided with a fan casing 14, comprises inlet guide vanes 15, fan blades 16, and outlet guide vanes 17. The fan blades 16 are integral with second stage blades 18 of the turbine 13, labyrinth seals 19, 20 being provided where the integral blades 16, 18 pass through the engine casing 11. The output from the fan unit 12 is directed through the annular passage 21 between the fan casing 14 and the engine casing 11.

The downstream portion 22 of the fan casing 14 is part-spherical in shape and mounted closely about the portion 22 is a part-spherical outer portion 23 of a casing member 24. Sealing devices 25, 26 are provided at the downstream end of the portion 22 and at the upstream end of the portion 23 respectively so as to maintain a substantially gas-tight seal between these portions.

The casing member 24, which is mounted on pivots 27 extending at right angles to the longitudinal axis of the engine, is provided with radial spokes 28 which support an inner part-spherical portion 29. The latter is closely mounted about, so as to be substantially sealed to a part-spherical surface 30 at the downstream end of the engine casing 11.

Four hydraulically or pneumatically operated rams 31 are provided for effecting pivotal movement of the casing member 24 with respect to the engine casing 11. The limits of pivotal movement of the casing member 24 are indicated by chain dotted lines in FIGURE 3.

FIGURE 4 illustrates three of the engines 10 mounted substantially vertically in a wing 32 of a vertical take-off aircraft. The engines 10 in FIGURE 4 are mounted on horizontally disposed trunnions (not shown) so that they may be pivoted to the position illustrated in which there is an angle of $\alpha$ of 10° between their longitudinal axes and the vertical. As shown in FIGURE 4, the casing members 24 of the engines 10 have been pivoted to a position in which there is an angle of 10° between the longitudinal axes of the engines 10 and the casing members 24.

Thus in the FIGURE 4 position, the thrust developed by the turbine exhaust gases and by the air stream from the fan unit will be directed at an angle $\beta$ of 20° to the vertical with the result that there will be a substantial component of either forward or reverse thrust depending on the sense of the angle $\beta$. The FIGURE 4 position of the engines 10 is therefore used during the transition between vertical and forward flight and vice versa.

As is clearly shown in FIGURE 4, an advantage of the construction shown in the drawings is that the engines 10 may be mounted close to each other, since the thrust can be arranged at an angle of 20° to the vertical event though the engines 10 themselves are at an angle of only 10° to the vertical.

We claim:

1. In a vertical lift aircraft: a turbo-fan engine having fan means driven by turbine means, said turbo-fan engine having a longitudinal thrust axis and being pivotally mounted on the aircraft for movement about a pivotal axis transversely intersecting said thrust axis, said turbo-fan engine having an annular casing surrounding said fan means, said annular casing having a rear pivotable deflector portion movable with respect to its forward portion about a single pivotal axis coinciding with the engine pivotal axis, said pivotal deflector portion being part-spherical and mating with a part-spherical surface on the forward portion of the annular casing to remain in sealing engagement therewith throughout pivotal movement of the deflector portion relative to the forward portion, said part-spherical surfaces being centered on said single pivotal axis, means for pivoting the turbo-fan engine with respect to the aircraft, and means for pivoting said pivotable deflector portion relative to said forward portion of the annular casing, such relative pivotal movement of said deflector portion causing an exhaust gas deflection from the turbo-fan engine supplementary to that obtained by pivoting the entire turbo-fan engine relative to the aircraft.

2. In a vertical lift aircraft: a turbo-fan engine having fan means driven by turbine means, said turbo-fan engine having a longitudinal thrust axis and being pivotally mounted on the aircraft for movement about a pivotal axis transversely intersecting said thrust axis, said turbo-fan engine being provided with concentric inner and outer annular casings terminating substantially in a common plane, and defining a passageway in which said fan means is mounted, said inner and outer casings having respectively rear inner and outer pivotable deflector portions movable with respect to the forward portions about a single pivotal axis coinciding with the engine pivotal axis, the inner and outer deflector portions being part-spherical and mating respectively with part-spherical surfaces on the respective forward portions of said inner and outer casings to remain in sealing engagement therewith throughout pivotal movement of said deflector portions relative to the forward portions, said part-spherical surfaces being centered on said single pivotal axis, means for pivoting the turbo-fan engine with respect to the aircraft, and means for pivoting said inner and outer deflector portions relative to the respective forward portions of said inner and outer casings, such relative pivotal movement of said deflector portions causing an exhaust gas deflection from the turbo-fan engine supplementary to that obtained by pivoting the entire turbo-fan engine relative to the aircraft.

References Cited in the file of this patent

UNITED STATES PATENTS

| | | |
|---|---|---|
| 2,692,724 | McCleod | Oct. 26, 1954 |
| 2,762,584 | Price | Sept. 11, 1956 |
| 2,930,544 | Howell | Mar. 29, 1960 |
| 2,971,724 | Von Zborowski | Feb. 14, 1961 |